US012618929B2

(12) United States Patent
Stevens et al.

(10) Patent No.: US 12,618,929 B2
(45) **Date of Patent: \*May 5, 2026**

(54) NAVIGATIONAL BEACONING VIA DOPPLER NULL SCANNING (DNS)

(71) Applicant: Rockwell Collins, Inc., Cedar Rapids, IA (US)

(72) Inventors: James A. Stevens, Lucas, TX (US); Steven V. Schatz, Cedar Rapids, IA (US); Matthew D. Bousselot, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 389 days.

This patent is subject to a terminal disclaimer.

(21) Appl. No.: 18/198,025

(22) Filed: May 16, 2023

(65) Prior Publication Data

US 2023/0288520 A1 Sep. 14, 2023

Related U.S. Application Data

(63) Continuation-in-part of application No. 18/196,807, filed on May 12, 2023, now Pat. No. 12,498,442, (Continued)

(51) Int. Cl.
*H04W 56/00* (2009.01)
*G01S 5/00* (2006.01)
(Continued)

(52) U.S. Cl.
CPC .......... *G01S 5/0027* (2013.01); *G01S 13/583* (2013.01); *G01S 13/62* (2013.01); (Continued)

(58) Field of Classification Search
CPC ......... H04W 56/0015; H04W 56/0035; H04W 56/005; G01S 5/0027; G01S 13/583; (Continued)

(56) References Cited

U.S. PATENT DOCUMENTS 3,025,519 A 3/1962 Brown et al.
4,134,113 A 1/1979 Powell
(Continued)

FOREIGN PATENT DOCUMENTS

CN 101330448 A 12/2008
CN 101465793 A 6/2009
(Continued)

OTHER PUBLICATIONS

U.S. Appl. No. 17/233,107, filed Apr. 16 2021, Eric J. Loren.
(Continued)

*Primary Examiner* — Dominic E Rego
(74) *Attorney, Agent, or Firm* — Suiter Swantz IP

(57) ABSTRACT

A system includes at least a receiving (Rx) and transmitting (Tx) node in relative motion, the Rx node aboard an aircraft or other vehicle. The Rx and Tx nodes include a communications interface with antenna elements and a controller including one or more processors, each node knowing own-node velocity and orientation relative to a common reference frame known to both nodes. The Rx or Tx node may be time synchronized to apply Doppler corrections associated with each node's own motions relative to the common reference frame. The system may replace, enhance, or operate as a ground-based navigational station (e.g., wherein the Tx node operates as a VOR or NDB beacon) or a vehicle-based approach or landing system (e.g., wherein the Tx node is also vehicle-based), e.g., the Rx node determining a relative bearing to the Tx node based on Doppler corrections with respect to Tx-node transmissions.

17 Claims, 3 Drawing Sheets

Related U.S. Application Data which is a continuation-in-part of application No. 18/134,950, filed on Apr. 14, 2023, now Pat. No. 12,032,081, which is a continuation of application No. 17/534,061, filed on Nov. 23, 2021, now Pat. No. 11,665,658, said application No. 18/196,807 is a continuation-in-part of application No. 18/130,285, filed on Apr. 3, 2023, which is a continuation-in-part of application No. 17/990,491, filed on Nov. 18, 2022, now Pat. No. 12,335,138, which is a continuation-in-part of application No. 17/957,881, filed on Sep. 30, 2022, now Pat. No. 12,407,393, which is a continuation-in-part of application No. 17/857,920, filed on Jul. 5, 2022, now Pat. No. 12,287,418, which is a continuation-in-part of application No. PCT/US2022/024653, filed on Apr. 13, 2022, which is a continuation of application No. 17/233,107, filed on Apr. 16, 2021, now Pat. No. 11,726,162, said application No. 17/857,920 is a continuation of application No. 17/541,703, filed on Dec. 3, 2021, now Pat. No. 12,137,048, which is a continuation-in-part of application No. 17/408,156, filed on Aug. 20, 2021, now Pat. No. 11,737,121, and a continuation-in-part of application No. 17/233,107, filed on Apr. 16, 2021, now Pat. No. 11,726,162, and a continuation-in-part of application No. 17/079,175, filed on Oct. 23, 2020, now Pat. No. 11,304,084, and a continuation-in-part of application No. 17/020,231, filed on Sep. 14, 2020, now Pat. No. 11,296,966, which is a continuation-in-part of application No. 16/987,671, filed on Aug. 7, 2020, now Pat. No. 11,290,942, and a continuation-in-part of application No. 16/698,230, filed on Nov. 27, 2019, now Pat. No. 10,999,778, said application No. 17/857,920 is a continuation of application No. 17/534,061, filed on Nov. 23, 2021, now Pat. No. 11,665,658, said application No. 17/957,881 is a continuation-in-part of application No. 17/846,625, filed on Jun. 22, 2022, now Pat. No. 12,477,583, said application No. 17/990,491 is a continuation-in-part of application No. 17/941,907, filed on Sep. 9, 2022, now Pat. No. 12,316,403, which is a continuation-in-part of application No. 17/940,898, filed on Sep. 8, 2022, now Pat. No. 12,366,625, which is a continuation-in-part of application No. 17/857,920, filed on Jul. 5, 2022, now Pat. No. 12,287,418, application No. 18/198,025 is a continuation-in-part of application No. 18/196,912, filed on May 12, 2023, which is a continuation-in-part of application No. 18/134,950, filed on Apr. 14, 2023, now Pat. No. 12,032,081, and a continuation-in-part of application No. 18/130,285, filed on Apr. 3, 2023, application No. 18/198,025 is a continuation-in-part of application No. 18/196,931, filed on May 12, 2023, which is a continuation-in-part of application No. 18/134,950, filed on Apr. 14, 2023, now Pat. No. 12,032,081, and a continuation-in-part of application No. 18/130,285, filed on Apr. 3, 2023, application No. 18/198,025, filed on May 16, 2023 is a continuation-in-part of application No. 18/196,765, filed on May 12, 2023, now Pat. No. 12,326,506, which is a continuation-in-part of application No. 18/134,950, filed on Apr. 14, 2023, now Pat. No. 12,032,081, and a continuation-in-part of application No. 18/130,285, filed on Apr. 3, 2023, application No. 18/198,025 is a continuation-in-part of application No. 18/196,944, filed on May 12, 2023, now Pat. No. 12,474,431, which is a continuation-in-part of application No. 18/134,950, filed on Apr. 14, 2023, now Pat. No. 12,032,081, and a continuation-in-part of application No. 18/130,285, filed on Apr. 3, 2023, application No. 18/198,025 is a continuation-in-part of application No. 18/196,786, filed on May 12, 2023, now Pat. No. 12,504,496, which is a continuation-in-part of application No. 18/134,950, filed on Apr. 14, 2023, now Pat. No. 12,032,081, and a continuation-in-part of application No. 18/130,285, filed on Apr. 3, 2023, application No. 18/198,025 is a continuation-in-part of application No. 18/196,936, filed on May 12, 2023, which is a continuation-in-part of application No. 18/134,950, filed on Apr. 14, 2023, now Pat. No. 12,032,081, and a continuation-in-part of application No. 18/130,285, filed on Apr. 3, 2023.

(60) Provisional application No. 63/344,445, filed on May 20, 2022, provisional application No. 63/400,138, filed on Aug. 23, 2022.

(51) Int. Cl.
  *G01S 13/58* (2006.01)
  *G01S 13/62* (2006.01)

(52) U.S. Cl.
  CPC ... *H04W 56/0015* (2013.01); *H04W 56/0035* (2013.01); *H04W 56/005* (2013.01)

(58) Field of Classification Search
  CPC ........ G01S 13/62; G01S 2205/03; G01S 3/14; G01S 5/0284; G01S 5/12; G08G 5/21; G08G 5/55; G08G 5/723; G08G 5/80; G08G 5/25; G08G 5/53
  See application file for complete search history.

(56)                    References Cited

U.S. PATENT DOCUMENTS

| | | | |
|---|---|---|---|
| 4,399,531 A | 8/1983 | Grande et al. |
| 4,438,439 A | 3/1984 | Shreve |
| 4,806,934 A | 2/1989 | Magoon |
| 5,706,010 A | 1/1998 | Franke |
| 5,835,482 A | 11/1998 | Allen |
| 5,898,902 A | 4/1999 | Tuzov |
| 6,008,758 A | 12/1999 | Campbell |
| 6,072,425 A | 6/2000 | Vopat |
| 6,111,541 A | 8/2000 | Karmel |
| 6,115,394 A | 9/2000 | Balachandran et al. |
| 6,148,219 A | 11/2000 | Engelbrecht et al. |
| 6,195,403 B1 | 2/2001 | Anderson et al. |
| 6,415,154 B1 | 7/2002 | Wang et al. |
| 6,496,940 B1 | 12/2002 | Horst et al. |
| 6,611,773 B2 | 8/2003 | Przydatek et al. |
| 6,662,229 B2 | 12/2003 | Passman et al. |
| 6,718,174 B2 | 4/2004 | Vayanos |
| 6,721,290 B1 | 4/2004 | Kondylis et al. |
| 6,744,740 B2 | 6/2004 | Chen |
| 6,845,091 B2 | 1/2005 | Ogier et al. |
| 7,023,818 B1 | 4/2006 | Elliott |
| 7,171,476 B2 | 1/2007 | Maeda et al. |
| 7,242,671 B2 | 7/2007 | Li et al. |
| 7,272,472 B1 | 9/2007 | McElreath |
| 7,299,013 B2 | 11/2007 | Rotta et al. |
| 7,313,401 B2 | 12/2007 | Karmel |
| 7,343,170 B1 | 3/2008 | Feeney et al. |
| 7,417,948 B2 | 8/2008 | Sjöblom |
| 7,418,343 B1 | 8/2008 | McGraw et al. |
| 7,558,575 B2 | 7/2009 | Losh et al. |
| 7,573,835 B2 | 8/2009 | Sahinoglu et al. |
| 7,633,921 B2 | 12/2009 | Thubert et al. |
| 7,636,061 B1 | 12/2009 | Thomas et al. |
| 7,639,652 B1 | 12/2009 | Amis et al. |

(56) References Cited

U.S. PATENT DOCUMENTS

| | | | |
|---|---|---|---|
| 7,679,551 B2 | 3/2010 | Petovello et al. |
| 7,698,463 B2 | 4/2010 | Ogier et al. |
| 7,719,989 B2 | 5/2010 | Yau |
| 7,729,240 B1 | 6/2010 | Crane et al. |
| 7,787,450 B1 | 8/2010 | Chan et al. |
| 7,881,229 B2 | 2/2011 | Weinstein et al. |
| 7,903,662 B2 | 3/2011 | Cohn |
| 7,983,239 B1 | 7/2011 | Weinstein et al. |
| 8,010,287 B1 | 8/2011 | Frank et al. |
| 8,036,224 B2 | 10/2011 | Axelsson et al. |
| 8,121,741 B2 | 2/2012 | Taft et al. |
| 8,138,626 B2 | 3/2012 | Jonsson et al. |
| 8,159,397 B2 | 4/2012 | Feller et al. |
| 8,159,954 B2 | 4/2012 | Larsson et al. |
| 8,217,836 B1 | 7/2012 | Anderson et al. |
| 8,218,550 B2 | 7/2012 | Axelsson et al. |
| 8,223,660 B2 | 7/2012 | Allan et al. |
| 8,223,868 B2 | 7/2012 | Lee |
| 8,341,289 B2 | 12/2012 | Hellhake et al. |
| 8,369,445 B2 | 2/2013 | Hensley |
| 8,396,686 B2 | 3/2013 | Song et al. |
| 8,490,175 B2 | 7/2013 | Barton et al. |
| 8,553,560 B2 | 10/2013 | Axelsson et al. |
| 8,587,770 B1 | 11/2013 | Johnston et al. |
| 8,599,956 B1 | 12/2013 | Mitchell |
| 8,614,997 B1 | 12/2013 | Herder |
| 8,630,291 B2 | 1/2014 | Shaffer et al. |
| 8,638,008 B2 | 1/2014 | Baldwin et al. |
| 8,717,230 B1 | 5/2014 | Fischi et al. |
| 8,717,935 B2 | 5/2014 | Lindem, III et al. |
| 8,732,338 B2 | 5/2014 | Hutchison et al. |
| 8,798,034 B2 | 8/2014 | Aggarwal et al. |
| 8,824,444 B1 | 9/2014 | Berenberg et al. |
| 8,849,596 B2 | 9/2014 | Ting et al. |
| 8,867,427 B2 | 10/2014 | Taori et al. |
| 8,880,001 B1 | 11/2014 | Hwang et al. |
| 8,909,471 B1 | 12/2014 | Jinkins et al. |
| 8,913,543 B2 | 12/2014 | Zainaldin |
| 8,930,044 B1 * | 1/2015 | Peeters ................... B64C 19/00 |
| | | 709/201 |
| 8,942,197 B2 | 1/2015 | Rudnick et al. |
| 8,964,739 B1 | 2/2015 | Wisehart |
| 8,989,326 B2 | 3/2015 | An et al. |
| 9,075,126 B2 | 7/2015 | Robinson |
| 9,179,475 B2 | 11/2015 | Koleszar et al. |
| 9,213,387 B2 | 12/2015 | King et al. |
| 9,246,795 B2 | 1/2016 | Madaiah et al. |
| 9,264,126 B2 | 2/2016 | Foster et al. |
| 9,294,159 B2 | 3/2016 | Duerksen |
| 9,304,198 B1 | 4/2016 | Doerry et al. |
| 9,325,513 B2 | 4/2016 | Liu et al. |
| 9,345,029 B2 | 5/2016 | Monte et al. |
| 9,355,564 B1 | 5/2016 | Tyson et al. |
| 9,430,947 B2 | 8/2016 | Richardson et al. |
| 9,435,884 B2 | 9/2016 | Inoue |
| 9,516,513 B2 | 12/2016 | Saegrov et al. |
| 9,523,761 B1 | 12/2016 | Hoffmann et al. |
| 9,544,162 B2 | 1/2017 | Vasseur et al. |
| 9,621,208 B1 | 4/2017 | Snodgrass et al. |
| 9,628,285 B2 | 4/2017 | Császár |
| 9,693,330 B1 | 6/2017 | Snodgrass et al. |
| 9,696,407 B1 | 7/2017 | Greenleaf et al. |
| 9,713,061 B2 | 7/2017 | Ruiz et al. |
| 9,719,803 B2 | 8/2017 | Ratcliff et al. |
| 9,766,339 B2 | 9/2017 | Robinson et al. |
| 9,858,822 B1 | 1/2018 | Gentry |
| 9,883,348 B1 | 1/2018 | Walker et al. |
| 9,979,462 B2 | 5/2018 | Watson et al. |
| 9,979,635 B2 | 5/2018 | Hellhake et al. |
| 10,067,199 B2 | 9/2018 | Eldridge et al. |
| 10,097,469 B2 | 10/2018 | Hui et al. |
| 10,098,051 B2 | 10/2018 | Mosko et al. |
| 10,205,654 B2 | 2/2019 | Choi et al. |
| 10,236,648 B2 | 3/2019 | Irons et al. |
| 10,257,655 B2 | 4/2019 | Cody |
| 10,365,376 B2 | 7/2019 | Lee et al. |
| 10,382,897 B1 | 8/2019 | Lanes et al. |
| 10,455,521 B2 | 10/2019 | Hudson et al. |
| 10,459,074 B1 | 10/2019 | Omer et al. |
| 10,484,837 B2 | 11/2019 | Navalekar et al. |
| 10,509,130 B2 | 12/2019 | Snyder et al. |
| 10,531,500 B2 | 1/2020 | Ulinskas |
| 10,601,684 B2 | 3/2020 | Hashmi et al. |
| 10,601,713 B1 | 3/2020 | Turgeman et al. |
| 10,609,622 B2 | 3/2020 | Bader et al. |
| 10,620,296 B1 | 4/2020 | Ezal et al. |
| 10,622,713 B2 | 4/2020 | Ma |
| 10,650,688 B1 | 5/2020 | DeRoche |
| 10,719,076 B1 | 7/2020 | Gavrilets et al. |
| 10,763,937 B2 | 9/2020 | Kusano et al. |
| 10,785,672 B2 | 9/2020 | Kwan et al. |
| 10,798,053 B2 | 10/2020 | Nolan et al. |
| 10,838,070 B1 | 11/2020 | Chapman et al. |
| 10,871,575 B2 | 12/2020 | Petrovic et al. |
| 10,873,429 B1 | 12/2020 | Kwon et al. |
| 10,908,277 B1 | 2/2021 | Roggendorf et al. |
| 10,931,570 B1 | 2/2021 | Kwon et al. |
| 10,965,584 B1 | 3/2021 | Kwon et al. |
| 10,979,348 B1 | 4/2021 | Kwon et al. |
| 10,993,201 B2 | 4/2021 | Luecke |
| 10,999,778 B1 | 5/2021 | Kwon et al. |
| 11,071,039 B2 | 7/2021 | Fallon et al. |
| 11,073,622 B2 | 7/2021 | Cohen |
| 11,082,324 B2 | 8/2021 | Ramanathan et al. |
| 11,129,078 B2 | 9/2021 | Yates et al. |
| 11,138,044 B2 | 10/2021 | Boehm et al. |
| 11,258,520 B2 | 2/2022 | Goergen et al. |
| 11,280,911 B2 | 3/2022 | Kennedy et al. |
| 11,284,295 B1 | 3/2022 | Kwon et al. |
| 11,290,942 B2 | 3/2022 | Kwon et al. |
| 11,411,613 B2 | 8/2022 | Jorgenson et al. |
| 11,415,664 B2 | 8/2022 | Hammes et al. |
| 11,443,638 B2 | 9/2022 | Byxbe |
| 11,500,111 B2 | 11/2022 | Frederiksen et al. |
| 11,528,675 B2 | 12/2022 | Nagaraja et al. |
| 11,536,850 B2 | 12/2022 | Sharma et al. |
| 11,611,375 B2 | 3/2023 | Newman et al. |
| 11,929,820 B2 | 3/2024 | Khan et al. |
| 11,977,173 B2 | 5/2024 | Loren et al. |
| 12,050,279 B2 | 7/2024 | Stevens et al. |
| 12,078,732 B1 | 9/2024 | Sirianni et al. |
| 12,111,406 B2 | 10/2024 | Sorsby et al. |
| 2002/0018448 A1 | 2/2002 | Amis et al. |
| 2002/0082024 A1 | 6/2002 | Bajikar |
| 2002/0173269 A1 | 11/2002 | Grayson et al. |
| 2003/0035589 A1 | 2/2003 | Kim |
| 2003/0151513 A1 | 8/2003 | Herrmann et al. |
| 2004/0012859 A1 | 1/2004 | Minefuji |
| 2004/0028016 A1 | 2/2004 | Billhartz |
| 2004/0032363 A1 | 2/2004 | Schantz et al. |
| 2004/0121782 A1 | 6/2004 | Tester |
| 2004/0123228 A1 | 6/2004 | Kikuchi et al. |
| 2004/0192334 A1 | 9/2004 | McBurney et al. |
| 2004/0213239 A1 | 10/2004 | Lin et al. |
| 2004/0246902 A1 | 12/2004 | Weinstein et al. |
| 2005/0025076 A1 | 2/2005 | Chaudhuri et al. |
| 2005/0033789 A1 | 2/2005 | Sirois |
| 2005/0047347 A1 | 3/2005 | Lee et al. |
| 2005/0141545 A1 | 6/2005 | Fein et al. |
| 2005/0192058 A1 | 9/2005 | Jung et al. |
| 2005/0219950 A1 | 10/2005 | Rowe |
| 2006/0010170 A1 | 1/2006 | Lashley et al. |
| 2006/0056421 A1 | 3/2006 | Zaki |
| 2006/0176847 A1 | 8/2006 | Chen et al. |
| 2006/0239238 A1 | 10/2006 | Fernandez-Corbaton et al. |
| 2007/0021122 A1 | 1/2007 | Lane et al. |
| 2007/0086541 A1 | 4/2007 | Moon et al. |
| 2007/0097880 A1 | 5/2007 | Rajsic |
| 2007/0109182 A1 | 5/2007 | Budic |
| 2007/0109979 A1 | 5/2007 | Fu et al. |
| 2007/0222665 A1 | 9/2007 | Koeneman |
| 2007/0223497 A1 | 9/2007 | Elson et al. |
| 2007/0299950 A1 | 12/2007 | Kulkarni |
| 2008/0068250 A1 | 3/2008 | Brandao et al. |

(56)          References Cited

U.S. PATENT DOCUMENTS

| | | | |
|---|---|---|---|
| 2008/0107034 A1 | 5/2008 | Jetcheva et al. | |
| 2008/0117904 A1 | 5/2008 | Radha et al. | |
| 2008/0158040 A1 | 7/2008 | Stayton et al. | |
| 2008/0219204 A1 | 9/2008 | Lee et al. | |
| 2008/0273582 A1 | 11/2008 | Gaal et al. | |
| 2008/0291945 A1 | 11/2008 | Luo | |
| 2008/0310325 A1 | 12/2008 | Yang | |
| 2008/0310354 A1 | 12/2008 | Hansen et al. | |
| 2009/0036144 A1 | 2/2009 | Wong et al. | |
| 2009/0086713 A1 | 4/2009 | Luo | |
| 2009/0203337 A1 | 8/2009 | Sisley et al. | |
| 2009/0207694 A1 | 8/2009 | Guigne et al. | |
| 2009/0232049 A1 | 9/2009 | Singh et al. | |
| 2009/0233544 A1 | 9/2009 | Oyman et al. | |
| 2009/0271054 A1 | 10/2009 | Dokken | |
| 2009/0290572 A1 | 11/2009 | Gonia et al. | |
| 2009/0303115 A1 | 12/2009 | Alizadeh-Shabdiz | |
| 2009/0310505 A1 | 12/2009 | Tsai et al. | |
| 2009/0312038 A1 | 12/2009 | Gildea | |
| 2009/0318138 A1 | 12/2009 | Zeng et al. | |
| 2010/0074101 A1 | 3/2010 | Skalecki et al. | |
| 2010/0074141 A1 | 3/2010 | Nguyen | |
| 2010/0111065 A1 | 5/2010 | Noh et al. | |
| 2010/0226450 A1 | 9/2010 | Tanaka | |
| 2010/0246660 A1 | 9/2010 | Matsuo et al. | |
| 2011/0006913 A1 | 1/2011 | Chen et al. | |
| 2011/0013487 A1 | 1/2011 | Zhou et al. | |
| 2011/0053494 A1 | 3/2011 | Kobayakawa | |
| 2011/0122849 A1 | 5/2011 | Jain et al. | |
| 2011/0169684 A1 | 7/2011 | Margolin | |
| 2011/0188378 A1 | 8/2011 | Collins et al. | |
| 2011/0199260 A1 | 8/2011 | Garrett et al. | |
| 2011/0312279 A1 | 12/2011 | Tsai et al. | |
| 2012/0092208 A1 | 4/2012 | LeMire et al. | |
| 2012/0098699 A1 | 4/2012 | Calmettes et al. | |
| 2012/0168566 A1* | 7/2012 | Lee | B64G 1/1014 |
| | | | 244/158.4 |
| 2013/0006834 A1 | 1/2013 | Waelbroeck et al. | |
| 2013/0069834 A1 | 3/2013 | Duerksen | |
| 2013/0094366 A1 | 4/2013 | Lee et al. | |
| 2013/0100942 A1 | 4/2013 | Rudnick et al. | |
| 2013/0130682 A1 | 5/2013 | Awad et al. | |
| 2013/0135137 A1 | 5/2013 | Mulder et al. | |
| 2013/0195017 A1 | 8/2013 | Jamadagni et al. | |
| 2013/0197835 A1 | 8/2013 | Jonsson et al. | |
| 2013/0250808 A1 | 9/2013 | Hui et al. | |
| 2014/0017196 A1 | 1/2014 | Han et al. | |
| 2014/0018097 A1 | 1/2014 | Goldstein | |
| 2014/0029704 A1 | 1/2014 | Becker | |
| 2014/0188990 A1 | 7/2014 | Fulks | |
| 2014/0229519 A1 | 8/2014 | Dietrich et al. | |
| 2014/0236483 A1 | 8/2014 | Beaurepaire et al. | |
| 2014/0258201 A1 | 9/2014 | Finlow-Bates | |
| 2014/0292568 A1 | 10/2014 | Fleming et al. | |
| 2014/0340192 A1 | 11/2014 | Yamada et al. | |
| 2015/0010153 A1 | 1/2015 | Robertson | |
| 2015/0025818 A1 | 1/2015 | Das | |
| 2015/0071332 A1 | 3/2015 | Xu et al. | |
| 2015/0094100 A1 | 4/2015 | Opshaug et al. | |
| 2015/0222479 A1 | 8/2015 | Kim et al. | |
| 2015/0287224 A1* | 10/2015 | Hooper | G06T 11/203 |
| | | | 345/442 |
| 2015/0296335 A1 | 10/2015 | Joshi et al. | |
| 2015/0326689 A1 | 11/2015 | Leppänen et al. | |
| 2015/0366470 A1 | 12/2015 | Kim et al. | |
| 2016/0139241 A1 | 5/2016 | Holz et al. | |
| 2016/0150465 A1 | 5/2016 | Jung et al. | |
| 2016/0187458 A1 | 6/2016 | Shah et al. | |
| 2016/0189381 A1 | 6/2016 | Rhoads | |
| 2016/0265968 A1 | 9/2016 | Boutaud | |
| 2016/0373997 A1 | 12/2016 | Petersen et al. | |
| 2017/0026797 A1 | 1/2017 | Venkataraman et al. | |
| 2017/0111266 A1 | 4/2017 | Ko | |
| 2017/0111771 A1 | 4/2017 | Haque et al. | |
| 2017/0134227 A1 | 5/2017 | Song et al. | |
| 2017/0149658 A1 | 5/2017 | Rimhagen et al. | |
| 2017/0168163 A1 | 6/2017 | Small | |
| 2017/0259920 A1* | 9/2017 | Lai | G05D 1/0011 |
| 2017/0366223 A1 | 12/2017 | Stofer et al. | |
| 2018/0011200 A1 | 1/2018 | Ramamurthy et al. | |
| 2018/0013665 A1 | 1/2018 | Ko et al. | |
| 2018/0026475 A1 | 1/2018 | Gelonese et al. | |
| 2018/0083730 A1 | 3/2018 | Gulati et al. | |
| 2018/0091211 A1 | 3/2018 | Hessler et al. | |
| 2018/0098263 A1 | 4/2018 | Luo et al. | |
| 2018/0146489 A1 | 5/2018 | Jin et al. | |
| 2018/0156919 A1* | 6/2018 | Bieber | G01S 19/015 |
| 2018/0234336 A1 | 8/2018 | Schumm et al. | |
| 2018/0302807 A1 | 10/2018 | Chen et al. | |
| 2018/0317226 A1 | 11/2018 | Sakoda | |
| 2019/0098625 A1 | 3/2019 | Johnson et al. | |
| 2019/0222302 A1 | 7/2019 | Lin et al. | |
| 2019/0251848 A1 | 8/2019 | Sivanesan et al. | |
| 2019/0294165 A1* | 9/2019 | Hofmann | A62C 3/0221 |
| 2019/0317207 A1 | 10/2019 | Schroder et al. | |
| 2019/0332067 A1 | 10/2019 | Zhao et al. | |
| 2019/0349172 A1 | 11/2019 | Zhang | |
| 2020/0011968 A1 | 1/2020 | Hammes et al. | |
| 2020/0018603 A1* | 1/2020 | Deng | H04W 4/35 |
| 2020/0052997 A1 | 2/2020 | Ramanathan et al. | |
| 2020/0092949 A1 | 3/2020 | Donepudi et al. | |
| 2020/0196309 A1 | 6/2020 | Amouris | |
| 2020/0236607 A1 | 7/2020 | Zhu et al. | |
| 2020/0292706 A1 | 9/2020 | Hexsel et al. | |
| 2020/0350983 A1 | 11/2020 | Alasti et al. | |
| 2020/0371247 A1 | 11/2020 | Marmet | |
| 2020/0391061 A1* | 12/2020 | Enejehlm | B25J 19/02 |
| 2020/0396708 A1 | 12/2020 | Bharadwaj et al. | |
| 2021/0080967 A1* | 3/2021 | Pettinger | G05D 1/0221 |
| 2021/0083917 A1 | 3/2021 | Konishi et al. | |
| 2021/0153097 A1 | 5/2021 | Du et al. | |
| 2021/0201044 A1 | 7/2021 | Herdade et al. | |
| 2021/0302956 A1 | 9/2021 | Sudhakaran et al. | |
| 2021/0359752 A1 | 11/2021 | Wang et al. | |
| 2021/0385879 A1 | 12/2021 | Mahalingam et al. | |
| 2021/0405176 A1 | 12/2021 | Luo | |
| 2022/0015101 A1 | 1/2022 | Gallagher et al. | |
| 2022/0021702 A1 | 1/2022 | Bouthemy | |
| 2022/0030511 A1 | 1/2022 | Wang et al. | |
| 2022/0038139 A1 | 2/2022 | Löwenmark et al. | |
| 2022/0060959 A1 | 2/2022 | Atungsiri et al. | |
| 2022/0069901 A1 | 3/2022 | Tian et al. | |
| 2022/0085892 A1 | 3/2022 | Sorge | |
| 2022/0086818 A1 | 3/2022 | Nam et al. | |
| 2022/0143428 A1 | 5/2022 | Goetz et al. | |
| 2022/0159741 A1 | 5/2022 | Hoang et al. | |
| 2022/0173799 A1 | 6/2022 | Wigard et al. | |
| 2022/0198351 A1 | 6/2022 | Beaurepaire et al. | |
| 2022/0268916 A1 | 8/2022 | Nagpal | |
| 2022/0286254 A1 | 9/2022 | Cha et al. | |
| 2022/0295492 A1 | 9/2022 | Shattil | |
| 2022/0317290 A1 | 10/2022 | Kostanic et al. | |
| 2022/0334211 A1 | 10/2022 | Loren et al. | |
| 2022/0342027 A1 | 10/2022 | Loren et al. | |
| 2022/0360320 A1 | 11/2022 | Miao et al. | |
| 2022/0365165 A1 | 11/2022 | Kirchner et al. | |
| 2022/0368410 A1 | 11/2022 | Ma et al. | |
| 2022/0413118 A1 | 12/2022 | Starr et al. | |
| 2023/0033690 A1 | 2/2023 | Factor et al. | |
| 2023/0057666 A1 | 2/2023 | Kwon et al. | |
| 2023/0081728 A1 | 3/2023 | Kwon et al. | |
| 2023/0111316 A1 | 4/2023 | Ma et al. | |
| 2023/0118153 A1 | 4/2023 | Amorim et al. | |
| 2023/0133633 A1 | 5/2023 | Park et al. | |
| 2023/0135149 A1 | 5/2023 | Krishnamurthy et al. | |
| 2023/0179260 A1 | 6/2023 | Abdelghaffar et al. | |
| 2023/0280435 A1 | 9/2023 | Schatz et al. | |
| 2023/0280436 A1 | 9/2023 | Loren et al. | |
| 2023/0280437 A1 | 9/2023 | Kwon et al. | |
| 2023/0288518 A1 | 9/2023 | Graf et al. | |
| 2023/0288519 A1 | 9/2023 | Schatz et al. | |
| 2023/0288521 A1 | 9/2023 | Kwon et al. | |
| 2023/0296716 A1 | 9/2023 | Dean et al. | |
| 2023/0379007 A1 | 11/2023 | Kwon et al. | |

(56)                References Cited

U.S. PATENT DOCUMENTS

| | | |
|---|---|---|
| 2023/0379008 A1 | 11/2023 | Sorsby et al. |
| 2023/0393229 A1 | 12/2023 | Loren et al. |
| 2023/0400549 A1 | 12/2023 | Duan et al. |
| 2024/0151800 A1 | 5/2024 | Stevens et al. |

FOREIGN PATENT DOCUMENTS

| | | |
|---|---|---|
| CN | 101330448 B | 12/2010 |
| CN | 101465793 B | 2/2011 |
| CN | 202257277 U | 5/2012 |
| CN | 101686179 B | 1/2013 |
| CN | 103067286 B | 6/2016 |
| CN | 107645417 A | 1/2018 |
| CN | 110234147 A | 9/2019 |
| CN | 115085799 A | 9/2022 |
| CN | 115688598 A | 2/2023 |
| DE | 102010010935 A1 | 9/2011 |
| EP | 0908022 A2 | 4/1999 |
| EP | 1912392 A2 | 4/2008 |
| EP | 2208084 A4 | 11/2011 |
| EP | 2743726 A1 | 6/2014 |
| EP | 2466964 B1 | 12/2017 |
| EP | 3026961 B1 | 8/2020 |
| GB | 2441610 B | 12/2011 |
| GB | 2542491 A | 3/2017 |
| GB | 2568122 B | 11/2019 |
| GB | 2598610 A | 3/2022 |
| JP | 4290684 B2 | 7/2009 |
| JP | 5164157 B2 | 3/2013 |
| KR | 1020040107702 A | 12/2004 |
| KR | 100568976 B1 | 4/2006 |
| KR | 1020060078814 A | 7/2006 |
| KR | 101231707 B1 | 2/2013 |
| KR | 1020160071964 A | 6/2016 |
| RU | 2718131 C1 | 3/2020 |
| WO | 2008157609 A3 | 3/2009 |
| WO | 2012062091 A1 | 5/2012 |
| WO | 2012165938 A1 | 12/2012 |
| WO | 2015114077 A1 | 8/2015 |
| WO | 2015143604 A1 | 10/2015 |
| WO | 2017101575 A1 | 6/2017 |
| WO | 2018077864 A1 | 5/2018 |
| WO | 2019045767 A1 | 3/2019 |
| WO | 2020117427 A1 | 6/2020 |
| WO | 2020165627 A1 | 8/2020 |
| WO | 2020220233 A1 | 11/2020 |
| WO | 2021251902 A1 | 12/2021 |
| WO | 2022003386 A1 | 1/2022 |
| WO | 2022202858 A1 | 9/2022 |
| WO | 2022221429 A1 | 10/2022 |
| WO | 2022232336 A1 | 11/2022 |
| WO | 2022233042 A1 | 11/2022 |
| WO | 2022233314 A1 | 11/2022 |
| WO | 2023001520 A1 | 1/2023 |
| WO | 2023030622 A1 | 3/2023 |
| WO | 2023031904 A1 | 3/2023 |
| WO | 2023047336 A1 | 3/2023 |
| WO | 2023057655 A1 | 4/2023 |
| WO | 2023067552 A1 | 4/2023 |
| WO | 2023068990 A1 | 4/2023 |
| WO | 2023081918 A1 | 5/2023 |

OTHER PUBLICATIONS

U.S. Appl. No. 17/408,156, filed Aug. 20, 2021, Tj T. Kwon.

U.S. Appl. No. 17/534,061, filed Nov. 23, 2021, William B. Sorsby.

U.S. Appl. No. 17/857,920, filed Jul. 5, 2022, Eric J. Loren.

U.S. Appl. No. 63/344,445, filed May 20, 2022, Eric J. Loren.

U.S. Appl. No. 16/369,398, filed Mar. 29, 2019, Kwon.

U.S. Appl. No. 16/987,671, filed Aug. 7, 2021, Kwon et al.

U.S. Appl. No. 17/233,107, filed Apr. 16, 2022, Loren et al.

U.S. Appl. No. 17/541,703, filed Dec. 3, 2021, Kwon et al.

U.S. Appl. No. 17/857,920, filed Jul. 5, 2022, Loren et al.

DSSS in a Nutshell, Basics of Design, Research & Design Hub, Sep. 14, 2020.

Extended Search Report for European Application No. 21188737.7 dated Dec. 10, 2021, 8 pages.

Extended Search Report in European Application No. 21190368.7 dated Jan. 5, 2022, 10 pages.

Kwon et al., "Efficient Flooding with Passive Clustering (PC) in Ad Hoc Networks", Computer Communication Review. 32. 44-56. 10.1145/510726.510730, Aug. 11, 2003, 13 pages.

Martorella, M. et al., Ground Moving Target Imaging via SDAP-ISAR Processing: Review and New Trends. Sensors 2021, 21, 2391. https://doi.org/10.3390/s21072391.

Peng Wang, et al., "Convergence of Satellite and Terrestrial Networks: A Comprehensive Survey networks" IEEEAcess; vol. 4, Dec. 31, 2019.

Pulak K. Chowdhury, et al. "Handover Schemes in Satellite Networks: State-of-the-Art and Future Research Directions" 4th Quarter 2006, vol. 8, No. 4, Oct. 1, 2006.

Seddigh et al., "Dominating sets and neighbor elimination-based broadcasting algorithms in wireless networks", IEE Transactions in Parallel and Distributed Systems, IEEE, USA, vol. 13, No. 1, Jan. 1, 2002 (Jan. 1, 2002), pp. 14-25, XP011094090, ISSN: 1045-9219, DOI 10.1109/71.9800214.

Yi et al., "Passive Clustering in Ad Hoc Networks (PC)", URL: https://tools.ietf.org/html/drafts-yi-manet-pc-00, Nov. 14, 2001, 31 pages.

Seddigh M et al: "Dominating sets and neighbor elimination-based broadcasting algorithms in wireless networks", vol. 13, No. 1, Jan. 1, 2002, pp. 14-25.

Turgut D. et al: "Optimizing clustering algorithm in mobile ad hoc networks using simulated annealing", vol. 3, Mar. 16, 20023, pp. 1492-1497.

Extended European Search Report dated Apr. 4, 2024; European Application No. 21190368.7.

* cited by examiner

NAVIGATIONAL BEACONING VIA DOPPLER NULL SCANNING (DNS)

CROSS-REFERENCE TO RELATED APPLICATIONS

The present application is related to and claims priority from the following US Patent Applications:

(a) U.S. patent application Ser. No. 17/233,107, filed Apr. 16, 2021, which is incorporated by reference in its entirety;

(b) PCT Patent Application No. PCT/US22/24653, filed Apr. 13, 2022, which claims priority to U.S. patent application Ser. No. 17/233,107, filed Apr. 16, 2021, all of which are incorporated by reference in its entirety;

(c) U.S. patent application Ser. No. 17/408,156, filed Aug. 20, 2021, which claims priority to U.S. patent application Ser. No. 17/233,107, filed Apr. 16, 2021, all of which are incorporated by reference in its entirety;

(d) U.S. patent application Ser. No. 17/541,703, filed Dec. 3, 2021, which is incorporated by reference in its entirety, which claims priority to:

U.S. patent application Ser. No. 17/408,156, filed Aug. 20, 2021, which is incorporated by reference in its entirety; and U.S. patent application Ser. No. 17/233,107, filed Apr. 16, 2021, all of which is incorporated by reference in its entirety;

(e) U.S. patent application Ser. No. 17/534,061, filed Nov. 23, 2021, which is incorporated by reference in its entirety;

(f) U.S. Patent Application No. 63/344,445, filed May 20, 2022, which is incorporated by reference in its entirety;

(g) U.S. patent application Ser. No. 17/857,920, filed Jul. 5, 2022, which is incorporated by reference in its entirety;

(h) U.S. Patent Application No. 63/400,138, filed Aug. 23, 2022, which is incorporated by reference in its entirety;

(i) U.S. patent application Ser. No. 17/940,898, filed Sep. 8, 2022, which is incorporated by reference in its entirety;

(j) U.S. patent application Ser. No. 17/941,907, filed Sep. 9, 2022, which is incorporated by reference in its entirety;

(k) U.S. patent application Ser. No. 17/957,881, filed Sep. 30, 2022, which is incorporated by reference in its entirety;

(l) U.S. patent application Ser. No. 17/990,491, filed Nov. 18, 2022, which is incorporated by reference in its entirety;

(m) U.S. patent application Ser. No. 18/130,285, filed Apr. 3, 2023, which is herein incorporated by reference in its entirety;

(n) U.S. patent application Ser. No. 18/134,950, filed Apr. 14, 2023, which is incorporated by reference in its entirety;

(o) U.S. patent application Ser. No. 18/196,807, filed May 12, 2023, which is incorporated by reference in its entirety;

(p) U.S. patent application Ser. No. 18/196,912, filed May 12, 2023, which is incorporated by reference in its entirety;

(q) U.S. patent application Ser. No. 18/196,931, filed May 12, 2023, which is incorporated by reference in its entirety;

(r) U.S. patent application Ser. No. 18/196,765, filed May 12, 2023, which is incorporated by reference in its entirety;

(s) U.S. patent application Ser. No. 18/196,944, filed May 12, 2023, which is incorporated by reference in its entirety;

(t) U.S. patent application Ser. No. 18/196,786, filed May 12, 2023, which is incorporated by reference in its entirety; and (u) U.S. patent application Ser. No. 18/196,936, filed May 12, 2023, which is incorporated by reference in its entirety.

BACKGROUND

Mobile Ad-hoc NETworks (MANET; e.g., "mesh networks") are known in the art as quickly deployable, self-configuring wireless networks with no pre-defined network topology. Each communications node within a MANET is presumed to be able to move freely. Additionally, each communications node within a MANET may be required to forward (relay) data packet traffic. Data packet routing and delivery within a MANET may depend on a number of factors including, but not limited to, the number of communications nodes within the network, communications node proximity and mobility, power requirements, network bandwidth, user traffic requirements, timing requirements, and the like.

MANETs face many challenges due to the limited network awareness inherent in such highly dynamic, low-infrastructure communication systems. Given the broad ranges in variable spaces, the challenges lie in making good decisions based on such limited information. For example, in static networks with fixed topologies, protocols can propagate information throughout the network to determine the network structure, but in dynamic topologies this information quickly becomes stale and must be periodically refreshed. It has been suggested that directional systems are the future of MANETs, but the potential of this future has not as yet been fully realized. In addition to topology factors, fast-moving platforms (e.g., communications nodes moving relative to each other) experience a frequency Doppler shift (e.g., offset) due to the relative radial velocity between each set of nodes. This Doppler frequency shift often limits receive sensitivity levels which can be achieved by a node within a mobile network.

Conventional MANETs may be associated with relatively slow discovery times between nodes, e.g., the time required for nodes within the MANET to discover each other, establish relative positioning among each other, and establish communications links among each other. Further, with respect to some directional MANET implementations, it may be necessary or advisable to limit or preclude transmissions in a particular direction to reduce or prevent detection or interception of a transmission by an adversary. Further still, with respect to some MANET implementations it may be necessary or advisable to reuse frequencies or frequency bands (e.g., if available bandwidth is limited). However, spatial reuse within a MANET can be complicated by the potential of multiple transmissions at a given frequency interfering with one another if the transmitting nodes are not far enough away from each other.

SUMMARY

In an aspect, a system including at least a transmitting (Tx) node and a receiving (Rx) node of a multi-node network, the Tx and Rx nodes in relative motion to each other, is disclosed. In embodiments, each node includes a communications interface comprising one or more antenna elements and a controller including one or more processors, each controller having velocity and orientation information of its node. The Tx and Rx nodes are time synchronized to apply Doppler offset corrections based on the node's own motion relative to a common stationary inertial reference frame known to both nodes prior to transmission by the Tx node or reception by the Rx node. The Tx node may serve as a navigational beacon marking a target location, and the Rx node determines a relative bearing to the Tx node based on the applied Doppler offset corrections.

In some embodiments, the Tx-node navigational beacon is a ground-based station having a fixed known location.

In some embodiments, the Tx node replaces, enhances, and/or operates as a marker beacon compatible with aircraft-based Instrument Landing Systems (ILS), and the fixed beacon location is associated with an airport or with a particular runway thereof.

In some embodiments, the Tx node replaces, enhances, and/or operates as a Very High Frequency (VHF) Omnidirectional Range (VOR) ground station, e.g., transmitting and receiving in the 108-118 MHz VOR frequency range.

In some embodiments, the Rx node determines a range or distance between the Rx and Tx nodes.

In some embodiments, the Rx node determines the range via two-way timing and ranging (TWTR) exchange with the Tx node, based on the determined relative bearing.

In some embodiments, the target location marked by the Tx node is associated with a satellite-based navigation system or other absolute positioning system (e.g., with a known or knowable target position relative to the absolute positioning system), and the Rx node determines its own position relative to the absolute positioning system based on the determined bearing, range, and/or target position.

In embodiments, the Tx node replaces, enhances, and/or operates as a VOR/DME ground station combining VOR and Distance Measuring Equipment (DME).

In embodiments, the Tx node replaces, enhances, and/or operates as a TACtical Air Navigation (TACAN) ground station.

In embodiments, the Tx node replaces, enhances, and/or operates as a VORTAC facility combining VOR and TACAN ground station functionalities.

In some embodiments, the Tx node is embodied in an aircraft or other vehicle or mobile platform.

In some embodiments, the Rx node further determines a range or distance between the Rx and Tx nodes.

In some embodiments, the Rx node determines the range via two-way timing and ranging (TWTR) exchange with the Tx node, based on the determined relative bearing.

In some embodiments, the target location marked by the Tx node is associated with a satellite-based navigation system or other absolute positioning system (e.g., with a known or knowable target position relative to the absolute positioning system), and the Rx node determines its own position relative to the absolute positioning system based on the determined bearing, range, and/or target position.

In some embodiments, the Tx and Rx nodes replace, enhance, and/or function as a vehicle-based TACAN or Joint Precision Approach and Landing System (JPALS), e.g., wherein the Rx node is embodied aboard an aircraft and the target location marked by the Tx node is an aircraft carrier upon which the Rx node lands.

In some embodiments, the common reference frame is either a 2D or 3D reference frame.

In some embodiments, the antenna elements of the Tx and Rx nodes include omnidirectional and/or directional antenna elements.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1:
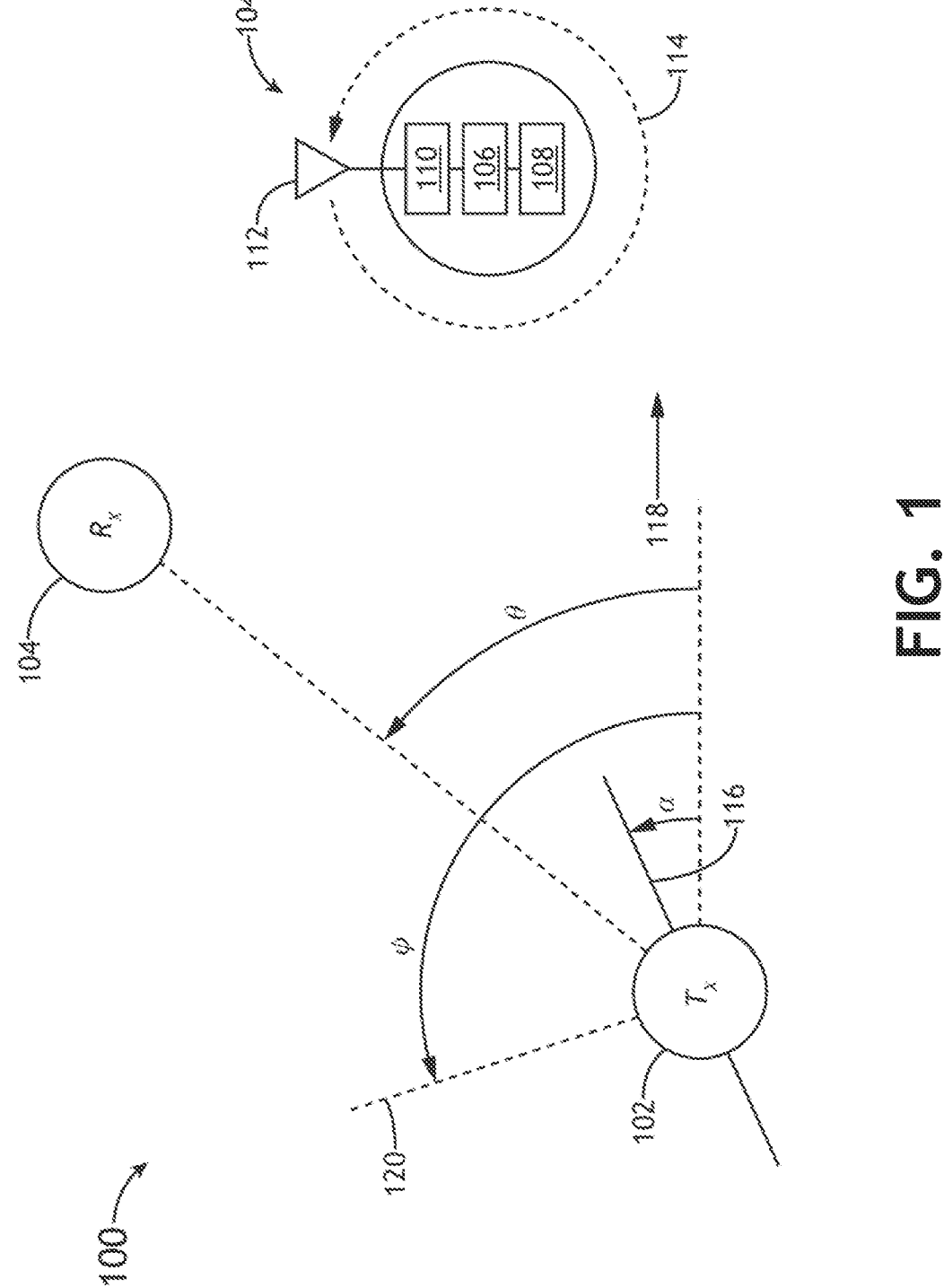
FIG. 1 is a diagrammatic illustration of a system of two nodes including at least a transmitter (Tx) node and a receiver (Rx) node according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment", "in embodiments" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to methods and systems for providing alternatives to conventional radionavigational beaconing via Doppler null scanning (DNS) and/or Doppler null spatial awareness (DNSA). For example, radio navigation beacons mark a desired location and allow direction finding equipment (e.g., aboard an aircraft or other vehicle) to find a relative bearing and/or range to the desired location, e.g., for en-route navigation, approach patterns, and landings. Radio navigational beacons are generally one-way transmitters, wherein a beacon transmits from a fixed location (e.g., a ground station) and direction-finding systems aboard aircraft, ships, and other like vehicles and mobile platforms receive and process the signal to obtain the relative bearing and/or range.

Embodiments of the inventive concepts disclosed herein may replace, enhance, and/or operate as a variety of navigational beacons, whether as fixed-location ground stations or as part of a vehicle-based approach or landing system. For example, VHF Omnidirectional Range (VOR) beacons may transmit signals allowing an aircraft to determine relative bearing to a VOR ground station; non-directional beacons (NDB) may be used to locate airway intersections and airports; instrument landing systems (ILS) marker beacons determine position along an established route such as an approach pattern or a specific runway; Distance Measuring Equipment (DME) may augment a VOR ground station by additionally providing distance and ranging information to the VOR/DME ground station; TACtical Air Navigation (TACAN) systems may be used to determine precision bearing and distance from a ground station. Radio navigational beacons may be either stationary at a fixed location (e.g., NDB, ILS, VOR, DME, some TACAN systems) or based on a mobile platform, e.g., carrier-based TACAN and/or Joint Precision Approach and Landing Systems (JPALS) allowing aircraft to safely approach and land upon a mobile aircraft carrier.

In embodiments, transmitting or receiving nodes within a DNS/DNSA system (e.g., which may transmit signals and/or receive signals) may utilize a directional (rather than omni-directional) antenna element for improved performance. Embodiments may utilize time synchronized scanning sequences (along with directionality) to improve metrics such as signal-to-noise ratio, signal acquisition time, speed of attaining situational awareness of attributes of surrounding nodes, range, and the like. In some embodiments, synced scanning sequences are used so that all transmitting angles of multiple systems are pointing in the same direction at any point in time during a synced sequence, as well as all the receiving angles, which are pointed in the opposite direction. In this regard, if a pulse happens to be sent towards a particular system, that particular system's receiving angle will be aimed in the opposite direction the pulse was sent from, such that the receiving angle is configured to receive the pulse. Such a configuration may vastly improve the ability to detect a relatively large quantity of nodes in a relatively short period of time over relatively large ranges, over relatively large amounts of noise/interference, and the like. In some embodiments, a zero value or near zero value (e.g., or the like such as a zero crossing) of a calculated net frequency shift of a received signal is used to determine a bearing angle between the source (e.g., Tx node) and the receiving node using a time-of-arrival of the received signal. The bearing angle may be made more accurate by combining (e.g., averaging) it with another bearing angle estimation determined from an angle of peak amplitude gain of the signal.

It is noted that U.S. patent application Ser. No. 17/857,920, filed Jul. 5, 2022, is at least partially reproduced by at least some (or all) of the illustrations of FIG. 1 and at least some (or all) of the corresponding language for FIG. 1 below. For example, at least some examples of Doppler nulling methods and systems may be better understood, in a nonlimiting manner, by reference to FIG. 1. Such embodiments and examples are provided for illustrative purposes and are not to be construed as necessarily limiting. For instance, in embodiments the transmitter node may be stationary rather than moving and/or vice versa. Moreover, and stated for purposes of navigating the disclosure only and not to be construed as limiting, descriptions that may relate to other language not necessarily reproduced from U.S. patent application Ser. No. 17/857,920 include the discussion and figures after FIG. 1.

Referring now to FIG. 1, in some embodiments, a stationary receiver may determine a cooperative transmitter's direction and velocity vector by using a Doppler null scanning approach in two dimensions. A benefit of the approach is the spatial awareness without exchanging explicit positional information. Other benefits include discovery, synchronization, and Doppler corrections which are important for communications. Some embodiment may combine coordinated transmitter frequency shifts along with the transmitter's motion induced Doppler frequency shift to produce unique net frequency shift signal characteristics resolvable using a stationary receiver to achieve spatial awareness. Further, some embodiment may include a three-dimensional (3D) approach with the receiver and the transmitter in motion.

Some embodiments may use analysis performed in a common reference frame (e.g., a common inertial reference frame, such as the Earth, which may ignore the curvature of Earth), and it is assumed that the communications system for each of the transmitter and receiver is informed by the platform of its own velocity and orientation. The approach described herein can be used for discovery and tracking, but the discussion here focuses on discovery which is often the most challenging aspect.

The meaning of the 'Doppler Null' can be explained in part through a review of the two-dimensional (2D) case without the receiver motion, and then may be expounded on by a review of adding the receiver motion to the 2D case, and then including receiver motion in the 3D case.

The Doppler frequency shift of a communications signal is proportional to the radial velocity between transmitter and receiver, and any significant Doppler shift is typically a hindrance that should be considered by system designers. In contrast, some embodiments utilize the Doppler effect to discriminate between directions with the resolution dictated by selected design parameters. Furthermore, such embodiments use the profile of the net frequency shift as the predetermined 'Null' direction scans through the angle space. The resultant profile is sinusoidal with an amplitude that provides the transmitter's speed, a zero net frequency shift when the 'Null' direction aligns with the receiver, and a minimum indicating the direction of the transmitter's velocity. It should be noted that that the transmitter cannot correct for Doppler in all directions at one time so signal characteristics are different in each direction and are different for different transmitter velocities as well. It is exactly these characteristics that the receiver uses to determine spatial awareness. The received signal has temporal spatial characteristics that can be mapped to the transmitter's direction and velocity. This approach utilizes the concept of a 'Null' which is simply the direction where the transmitter perfectly corrects for its own Doppler shift. The same 'Nulling' protocol runs on each node and scans through all directions, such as via a scanning sequence of a protocol. Here we arbitrarily illustrate the scanning with discrete successive steps of 10 degrees but in a real system; however, it should be understood that any suitable step size of degrees may be used for Doppler null scanning.

As already mentioned, one of the contributions of some embodiments is passive spatial awareness. Traditionally, spatial information for neighbor nodes (based on a global positioning system (GPS) and/or gyros and accelerometers) can be learned via data communication. Unfortunately, spatial awareness via data communication, referred to as active spatial awareness is possible only after communication has already been established, not while discovering those neighbor nodes. Data communication is only possible after the signals for neighbor nodes have been discovered, synchronized and Doppler corrected. In contrast, in some embodiments, the passive spatial awareness described herein may be performed using only synchronization bits associated with acquisition. This process can be viewed as physical layer overhead and typically requires much lower bandwidth compared to explicit data transfers. The physical layer overheads for discovery, synchronization and Doppler correction have never been utilized for topology learning for upper layers previously.

Traditionally, network topology is harvested via a series of data packet exchanges (e.g., hello messaging and link status advertisements). The passive spatial awareness may eliminate hello messaging completely and provide a wider local topology which is beyond the coverage of hello messaging. By utilizing passive spatial awareness, highly efficient mobile ad hoc networking (MANET) is possible. Embodiments may improve the functioning of a network itself.

Passive spatial awareness may provide benefits above and beyond MANET or communications implementations, however. For example, situational awareness via Doppler null scanning may be applied to fixed-receiver and mobile-transmitter as well as fixed-transmitter and mobile-receiver systems (e.g., replacing TACAN, VOR/DME, and other radionavigational beacons and stations), or systems where both transmitters and receivers are mobile (e.g., friend/foe identification and station-keeping between mobile platforms).

Referring to FIG. 1, a multi-node network 100 is disclosed. The multi-node network 100 may include multiple nodes, e.g., at least a transmitter (Tx) node 102 and a receiver (Rx) node 104.

In embodiments, the multi-node network 100 may include any multi-node network known in the art. For example, the multi-node network 100 may include a mobile ad-hoc network (MANET) or other like multi-node communications network in which the Tx and Rx nodes 102, 104 (as well as every other communications node within the multi-node network) are able to move freely and independently. Similarly, the Tx and Rx nodes 102, 104 may include any communications node known in the art which may be communicatively coupled. In this regard, the Tx and Rx nodes 102, 104 may include any communications node known in the art for transmitting/transceiving data packets. For example, the Tx and Rx nodes 102, 104 may include, but are not limited to, radios (such as on a vehicle or on a person), mobile phones, smart phones, tablets, smart watches, laptops, and the like. In embodiments, the Rx node 104 of the multi-node network 100 may each include, but are not limited to, a respective controller 106 (e.g., control processor), memory 108, communication interface 110, and antenna elements 112. (In embodiments, all attributes, capabilities, etc. of the Rx node 104 described below may similarly apply to the Tx node 102, and to any other communication node of the multi-node communication network 100.)

In embodiments, the controller 106 provides processing functionality for at least the Rx node 104 and can include any number of processors, micro-controllers, circuitry, field programmable gate array (FPGA) or other processing systems, and resident or external memory for storing data, executable code, and other information accessed or generated by the Rx node 104. The controller 106 can execute one or more software programs embodied in a non-transitory computer readable medium (e.g., memory 108) that implement techniques described herein. The controller 106 is not limited by the materials from which it is formed or the processing mechanisms employed therein and, as such, can be implemented via semiconductor(s) and/or transistors (e.g., using electronic integrated circuit (IC) components), and so forth.

In embodiments, the memory 108 can be an example of tangible, computer-readable storage medium that provides storage functionality to store various data and/or program code associated with operation of the Rx node 104 and/or controller 106, such as software programs and/or code segments, or other data to instruct the controller 106, and possibly other components of the Rx node 104, to perform the functionality described herein. Thus, the memory 108 can store data, such as a program of instructions for operating the Rx node 104, including its components (e.g., controller 106, communication interface 110, antenna elements 112, etc.), and so forth. It should be noted that while a single memory 108 is described, a wide variety of types and combinations of memory (e.g., tangible, non-transitory memory) can be employed. The memory 108 can be integral with the controller 106, can comprise stand-alone memory, or can be a combination of both. Some examples of the memory 108 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

In embodiments, the communication interface 110 can be operatively configured to communicate with components of the Rx node 104. For example, the communication interface 110 can be configured to retrieve data from the controller 106 or other devices (e.g., the Tx node 102 and/or other nodes), transmit data for storage in the memory 108, retrieve data from storage in the memory, and so forth. The communication interface 110 can also be communicatively coupled with the controller 106 to facilitate data transfer between components of the Rx node 104 and the controller 106. It should be noted that while the communication interface 110 is described as a component of the Rx node 104, one or more components of the communication interface 110 can be implemented as external components communicatively coupled to the Rx node 104 via a wired and/or wireless connection. The Rx node 104 can also include and/or connect to one or more input/output (I/O) devices. In embodiments, the communication interface 110 includes or is coupled to a transmitter, receiver, transceiver, physical connection interface, or any combination thereof.

It is contemplated herein that the communication interface 110 of the Rx node 104 may be configured to communicatively couple to additional communication interfaces 110 of additional communications nodes (e.g., the Tx node 102) of the multi-node network 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the antenna elements 112 may include directional or omnidirectional antenna elements capable of being steered or otherwise directed (e.g., via the communications interface 110) for spatial scanning in a full 360-degree arc (114) relative to the Rx node 104 (or even less than a full 360-degree arc).

In embodiments, the Tx node 102 and Rx node 104 may one or both be moving in an arbitrary direction at an arbitrary speed, and may similarly be moving relative to each other. For example, the Tx node 102 may be moving relative to the Rx node 104 according to a velocity vector 116 ($|V_T^{\rightarrow}|$), at a relative velocity $V_T$ and a relative angular direction (an angle $\alpha$ relative to an arbitrary direction 118 (e.g., due east); $\theta$ may be the angular direction of the Rx node relative to due east.

In embodiments, the Tx node 102 may implement a Doppler nulling protocol. For example, the Tx node 102 may adjust its transmit frequency to counter the Doppler frequency offset such that there is no net frequency offset (e.g., "Doppler null") in a Doppler nulling direction 120 (e.g., at an angle $\phi$ relative to the arbitrary direction 118). The transmitting waveform (e.g., the communications interface 110 of the Tx node 102) may be informed by the platform (e.g., the controller 106) of its velocity vector and orientation (e.g., $\alpha$, $|V_T^{\rightarrow}|$) and may adjust its transmitting frequency to remove the Doppler frequency shift at each Doppler nulling direction 120 and angle $\phi$.

To illustrate aspects of some embodiments, we show the 2D dependence of the net frequency shift for a stationary receiver as a function of Null direction across the horizon, as shown in a top-down view of FIG. 1, where the receiver node 104 is stationary and positioned $\theta$ from east relative to the transmitter, the transmitter node 102 is moving with a speed $|V_T^{\rightarrow}|$) and direction $\alpha$ from east and a snapshot of the scanning $\phi$ which is the 'Null' direction, exemplarily shown as 100 degrees in this picture.

The Doppler shift is a physical phenomenon due to motion and can be considered as a channel effect. In this example the transmitter node 102 is the only moving object, so it is the only source of Doppler shift. The Doppler frequency shift as seen by the receiver node 104 due to the transmitter node 102 motion is:

$$\frac{\Delta f_{DOPPLER}}{f} = \frac{|\overrightarrow{V_T}|}{c} \cos(\theta - \alpha),$$

where c is the speed of light.

The other factor is the transmitter frequency adjustment term that should exactly compensate the Doppler shift when the 'Null' direction aligns with the receiver direction. It is the job of the transmitter node 102 to adjust its transmit frequency according to its own speed ($|\overrightarrow{V_T}|$), and velocity direction $\alpha$. That transmitter frequency adjustment ($\Delta f_T$) is proportional to the velocity projection onto the 'Null' direction $\phi$ (120) and is:

$$\frac{\Delta f_T}{f} = -\frac{|\overrightarrow{V_T}|}{c} \cos(\varphi - \alpha).$$

The net frequency shift seen by the receiver is the sum of the two terms:

$$\frac{\Delta f_{net}}{f} = \frac{|\overrightarrow{V_T}|}{c} [\cos(\theta - \alpha) - \cos(\varphi - \alpha)].$$

It is assumed that the velocity vector and the direction changes slowly compared to the periodic measurement of $\Delta f_{net}$. Under those conditions, the unknown parameters (from the perspective of the receiver node 104) of $\alpha$, $|\overrightarrow{V_T}|$, and $\theta$ are constants.

Furthermore, it is assumed that the receiver node 104 has an implementation that resolves the frequency of the incoming signal, as would be understood to one of ordinary skill in the art.

The null scanning technique discussed herein illustrates a system and a method for spatial awareness from resolving the temporal spatial characteristics of the transmitter node's 102 radiation. This approach informs the receiver node 104 of the relative speed between the transmitter node 102 and receiver node 104 as well as the transmitter node direction and transmitter node velocity vector. This approach includes scanning through all directions and has a high sensitivity (e.g., low net frequency shift) when the null direction is aligned with the transmitter node direction. This approach can be implemented on a highly sensitive acquisition frame which is typically much more sensitive than explicit data transfers which allow for the ultra-sensitive spatial awareness with relatively low power.

This sentence may mark an end to the (at least partially) reproduced language from U.S. patent application Ser. No. 17/857,920 corresponding to the (at least partially) reproduced FIG. 1. However, note that this paragraph is nonlimiting, and changes may have been made and language added or removed, and not all the language above or corresponding figures above are necessarily reproduced from U.S. patent application Ser. No. 17/857,920.

Transmission of explicit position information (e.g., GPS coordinates using two-way higher-bandwidth communications) and/or velocity information is not necessarily needed to obtain such information when using Doppler-nulling. In embodiments, Doppler is minimized (or "nulled") via Doppler corrections in each direction an antenna is pointing based on at least a velocity of a node (e.g., which may be equally true for transmitter and receiver). Further, improved communication between nodes becomes possible whenever antennas are pointing toward each other. In embodiments, range to another node can be determined from the use of precisely-defined transmission intervals, as the transmission time in each can be known, a priori, to both the transmitter and receiver. With bearing angle, range, and relative velocity between nodes known via the Doppler-nulling protocol, it becomes possible to precisely discover and track another node's position without using any explicit data transfer (e.g., WiFi, Bluetooth, longer range similar bandwidth aerospace communication protocols, and/or the like).

Examples of Doppler nulling methods include, but are not limited to, methods and other descriptions (e.g., at least some theory and mathematical basis) are disclosed in U.S. patent application Ser. No. 17/233,107, filed Apr. 16, 2021, which is herein incorporated by reference in its entirety; U.S. patent application Ser. No. 17/534,061, filed Nov. 23, 2021, which is herein incorporated by reference in its entirety; and U.S. patent application Ser. No. 17/857,920, filed Jul. 5, 2022, which is herein incorporated by reference in its entirety; and U.S. patent application Ser. No. 17/941, 907, filed Sep. 9, 2022, which is herein incorporated by reference in its entirety. In embodiments, doppler nulling methods allow for benefits such as, but not limited to, relatively quickly and/or efficiently detecting transmitter nodes and determining transmitter node attributes (e.g., transmitter node speed, transmitter node bearing, relative bearing of transmitter node relative to receiver node, relative distance of transmitter node relative to receiver node, and the like).

Figure 2:
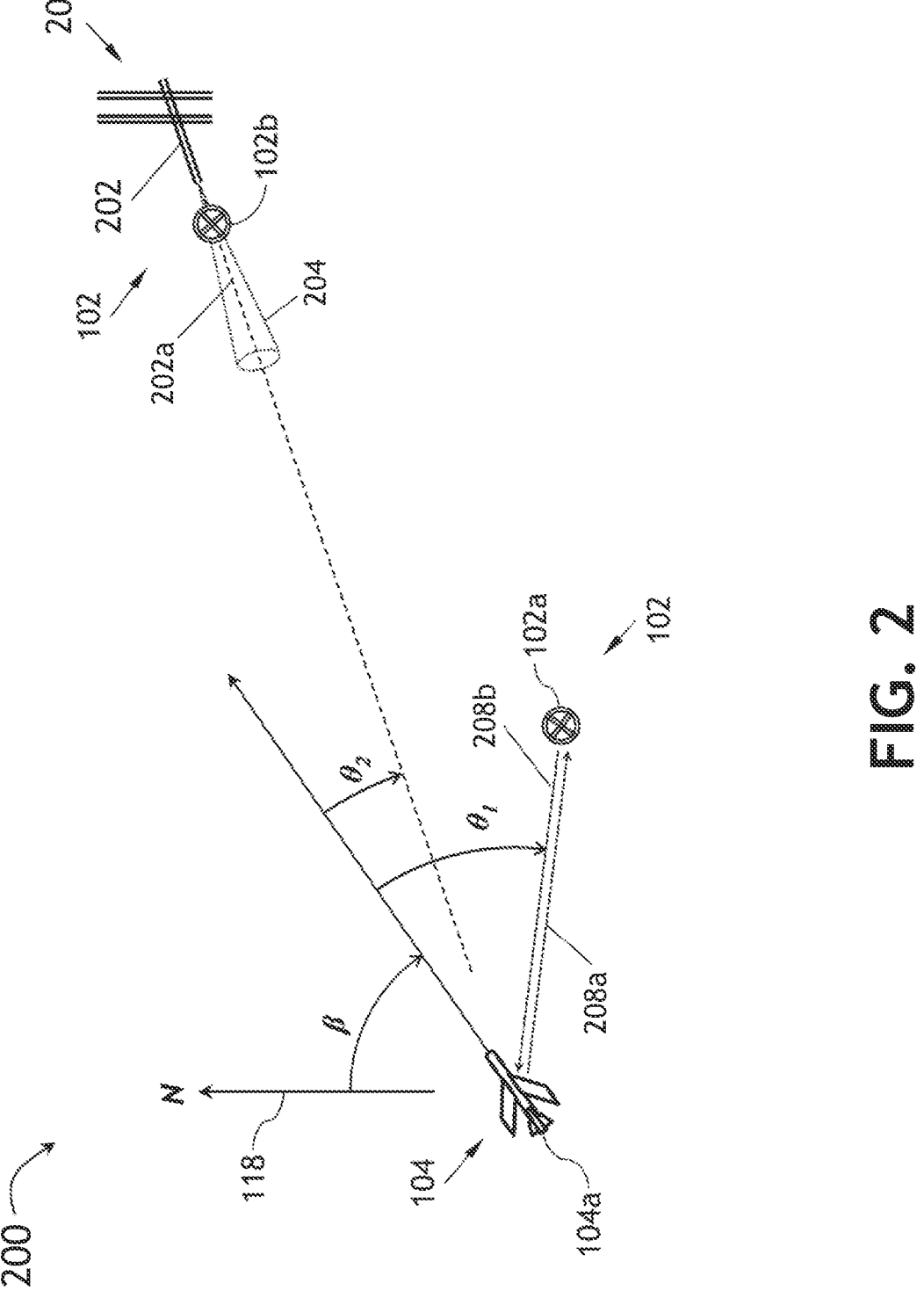
FIG. 2 is a diagrammatic illustration of the system of FIG. 1, wherein the system includes a mobile vehicle-based receiver (Rx) node and fixed-location transmitter (Tx) nodes at ground-based stations, including a Tx node configured to replace, enhance, and/or operate as a VHF omnidirectional range (VOR) station and a Tx node configured to replace, enhance, and/or operate as a nondirectional beacon (NDB) associated with an airport runway according to example embodiments of this disclosure.

Referring now to FIG. 2, the system 200 is shown. For example, the system 200 may include a portion of the multi-node network (100, FIG. 1), particularly a transmitter (Tx) node 102 configured for operation at a fixed ground-based location and a receiver (Rx) node 104 configured for operation aboard an aircraft 104a or other mobile platform (e.g., including water-based and ground-based vehicles), the mobile platform in motion relative to the Tx node.

In embodiments, the Tx node 102 may include a ground-based navigational beacon or ground station 102a configured for marking the fixed location of the node or station for the mobile Rx node 104 (or, e.g., for otherwise determining a relative bearing between the Tx and Rx nodes). For example, the aircraft 104a including the mobile Rx node 104 may be in motion along a heading $\beta$ relative to a reference direction 118 (e.g., magnetic north). In embodiments, the ground station 102a may replace or enhance a VHF Omni-directional Range (VOR) station or beacon providing line-of-sight transmissions in the Very High Frequency band or a portion thereof (e.g., 108-118 MHz), such that beacon transmissions may include transmitter-side Doppler nulling corrections in the frequency domain and/or time domain as appropriate (e.g., as disclosed or as incorporated by reference herein). In embodiments, the Rx node 104 aboard the aircraft 104a may receive transmissions from the replacement VOR station 102a and perform receiver-side Doppler nulling corrections with respect to the received transmissions to determine a relative bearing angle $\theta_1$ of the aircraft 104a relative to the replacement VOR station 102a. For example, based on the relative bearing angle $\theta_1$, the aircraft 104a may adjust its heading $\beta$, its velocity, or its altitude to execute a fly-over or fly-by of the replacement VOR station 102a, e.g., in fulfillment of an approach pattern.

In some embodiments, the Tx node 102 may be configured to replace or enhance a non-directional beacon 102b (NDB) configured for use with instrument landing systems (ILS) aboard the aircraft 104a and operating in conjunction with the Rx node 104. For example, the replacement NDB 102b may provide transmissions including transmitter-side Doppler nulling corrections as described above, via which the aircraft 104a may determine a relative bearing angle $\theta_2$ to the replacement NDB 102b and thereby align itself with a runway 202 (e.g., via the runway centerline 202a and/or a localizer cone 204 associated with the runway) at an airport 206.

In some embodiments, the Rx node 104 aboard the aircraft 104a may further determine a range (e.g., distance) to the Tx node 102 at either the replacement VOR station 102a or replacement NDB 102b, thereby additionally providing Distance Measuring Equipment (DME) services. For example, once the bearing angle $\theta_1$, $\theta_2$ is determined, the Rx node 104 and replacement VOR station 102a (and/or the replacement NDB 102b) may engage in precise narrow-beam two-way timing and ranging (TWTR) based on the respective determined bearing angle $\theta_1$, $\theta_2$. In embodiments, the Rx node 104 may include a TWTR transceiver capable of transmitting a pulse 208a toward the Tx node 102 at a first time of transmission (TOT$_1$), wherein the pulse may be detected or received by the Tx node at a first time of arrival (TOA$_1$). The Tx node 102 may respond by transmitting the pulse back (208b) to the Rx node 104 at a second time of transmission (TOT$_2$) wherein the returning pulse may be received by the Rx node at a second time of arrival (TOA$_2$). In embodiments, based on the speed of light and the round-trip travel time between the Tx node 102 and Rx node 104 (e.g., along a shortest possible path between the two nodes as determined by the bearing angle $\theta_1$, $\theta_2$), an accurate range between the two nodes may be determined. For example, assuming a bearing angle $\theta_1$, $\theta_2$ accurate to within 1 degree or less, TWTR transceivers at the replacement VOR station 102a and/or replacement NDB 102b and aboard the aircraft 104a may be capable of timing accuracies at the nanosecond level, thereby providing distance determinations accurate to within meters.

In some embodiments, the replacement VOR station 102a or replacement NDB 102b may be associated with a known absolute position relative to an absolute positioning system (e.g., GPS, Galileo, GLONASS, and/or other satellite-based global navigational and/or positioning systems). For example, the absolute position of either Tx node 102 may be known to the Rx node 104, which may determine an absolute position of the aircraft 104a based on the known position and the determined bearing and range. In some embodiments, the ground station 102a may similarly replace or enhance a VOR/Distance Measuring Equipment (DME) station, a TACtical Air Navigation (TACAN) station, or a VORTAC station combining VOR and TACAN facilities, in conjunction with which the Rx node 104 and embodying aircraft 104a may determine precision bearing and range information based on Doppler nulling corrections.

Figure 3:
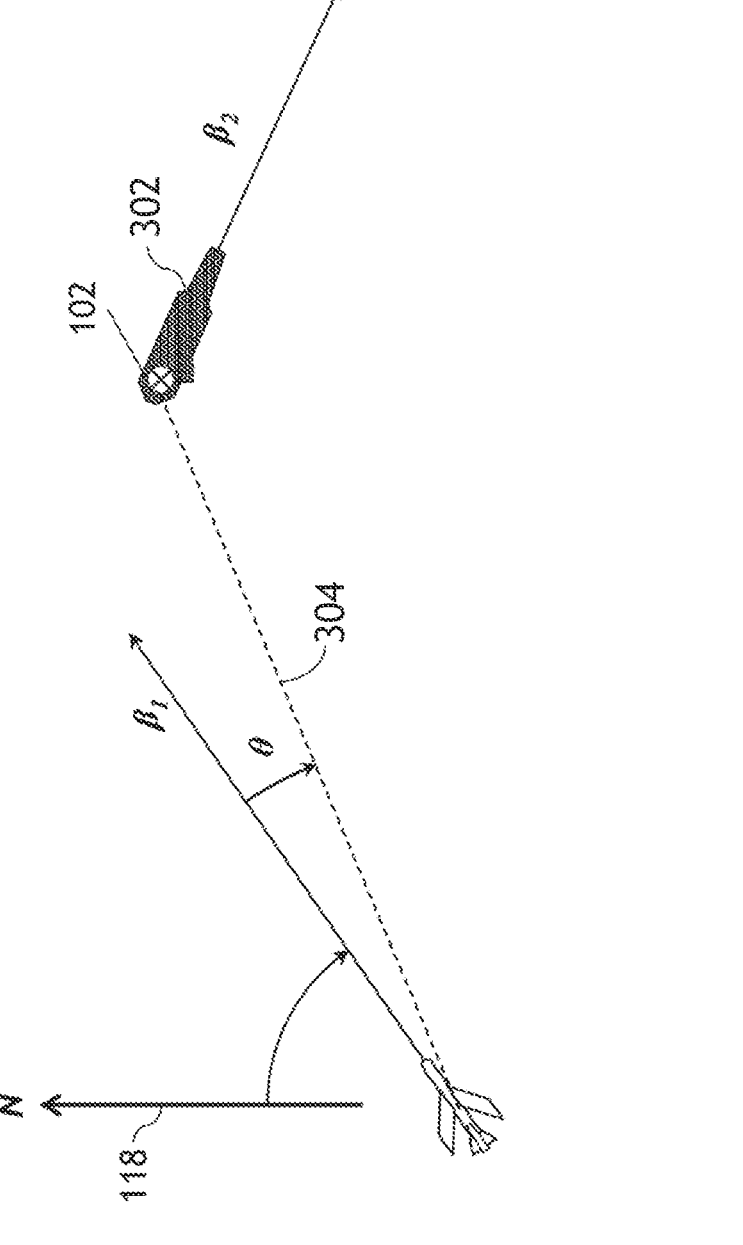
FIG. 3 is a diagrammatic illustration of the system of FIG. 1 wherein the Tx node is a mobile vehicle-based navigational beacon configured to replace, enhance, and/or operate as a vehicle-based approach and landing system according to example embodiments of this disclosure.

Referring now to FIG. 3, the system 300 may be implemented and may operate identically to the system 200 of FIG. 2, except with respect to the system 300 the Tx node 102 may likewise be in motion relative to the reference direction 118 (e.g., magnetic north).

In embodiments, the Tx node 102 (similarly to the Rx node 104 aboard the aircraft 104*a*, in motion along heading $\beta_1$) may likewise be embodied in a mobile platform, e.g., aboard an aircraft carrier 302 in motion along a heading $\beta_2$ relative to the reference direction 118. For example, the Tx node 102 may replace, enhance, and/or be implemented as carrier-based TACAN system and/or Joint Precision Approach Landing System (JPALS) system, via which the Rx node 104 may determine a relative bearing θ and/or a range 304 to the aircraft carrier 302, thereby aligning the aircraft 104*a* for an approach to and landing aboard the aircraft carrier.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A system, comprising:
a transmitter (Tx) node and a receiver (Rx) node, wherein each node of the Tx node and the Rx node comprises:
a communications interface including at least one antenna element; and
a controller operatively coupled to the communications interface, the controller including one or more processors, wherein the controller has information of own-node velocity and own-node orientation;
wherein the Rx node is in motion relative to the Tx node;
wherein each node of the Tx node and the Rx node are time synchronized to apply one or more Doppler corrections associated with said node's own motions relative to a common reference frame, the common reference frame is known to the Tx node and to the Rx node prior to the Tx node transmitting signals to the Rx node and prior to the Rx node receiving the signals from the Tx node;
wherein the Tx node is configured for operation in a navigational beacon marking a target location; and
wherein the Rx node is configured to determine a bearing to the Tx node based on the one or more Doppler corrections.

2. The system of claim 1, wherein:
the Tx node is configured for operation in a ground-based navigational beacon, and the target location is a fixed location.

3. The system of claim 2, wherein the ground-based navigational beacon is configured for at least one of replacement of, or operation as, an Instrument Landing System (ILS) marker beacon, wherein the target location is part of a route to an airport or to a runway thereof.

4. The system of claim 2, wherein the ground-based navigational beacon is a Very High Frequency (VHF) Omni-directional Range (VOR) ground station.

5. The system of claim 2, wherein the Rx node is further configured to determine a range between the Rx node and the Tx node.

6. The system of claim 5, wherein the Rx node is configured to determine the range via two-way timing and ranging (TWTR) exchange with the Tx node, based on the determined bearing.

7. The system of claim 6, wherein:
the target location is associated with a target position relative to an absolute positioning system;
and
the Rx node is configured to determine a receiver position of the Rx node relative to the absolute positioning system, the receiver position based on one or more of the determined bearing, the determined range, or the target position.

8. The system of claim 5, wherein the ground-based navigational beacon is configured for at least one of replacement of, or operation as, a VOR/Distance Measuring Equipment (DME) ground station.

9. The system of claim 5, wherein the ground-based navigational beacon is configured for at least one of replacement of, or operation as, a TACtical Air Navigation (TACAN) ground station.

10. The system of claim 5, wherein the ground-based navigational beacon is configured for at least one of replacement of, or operation as, a VORTAC facility combining a VOR ground station and a TACAN ground station.

11. The system of claim 1, wherein:
the Tx node is configured for use aboard a mobile platform.

12. The system of claim 11, wherein the Rx node is further configured to determine a range between the Rx node and the Tx node.

13. The system of claim 12, wherein the Rx node is configured to determine the range via two-way timing and ranging (TWTR) exchange with the Tx node, based on the determined bearing.

14. The system of claim 13, wherein:
the target location is associated with a target position relative to an absolute positioning system;
and
the Rx node is configured to determine a receiver position of the Rx node relative to the absolute positioning system, the receiver position based on one or more of the determined bearing, the determined range, or the target position.

15. The system of claim 11, wherein at least one of the Tx node and the Rx node is configured for configured for at least one of replacement of, or operation as, at least one of:
a vehicle-based TACAN system;
or
a vehicle-based Joint Precision Approach and Landing System (JPALS).

16. The system of claim 1, wherein the common reference frame is:

a two-dimensional (2D) stationary common inertial reference frame;

or a three-dimensional (3D) stationary common inertial reference frame.

17. The system of claim 1, wherein:

the at least one antenna element of the Tx node comprises at least one of a directional antenna element or an omnidirectional antenna element;

and wherein the at least one antenna element of the Rx node comprises at least one of a directional antenna element or an omnidirectional antenna element.

\* \* \* \* \*